Figure 1:
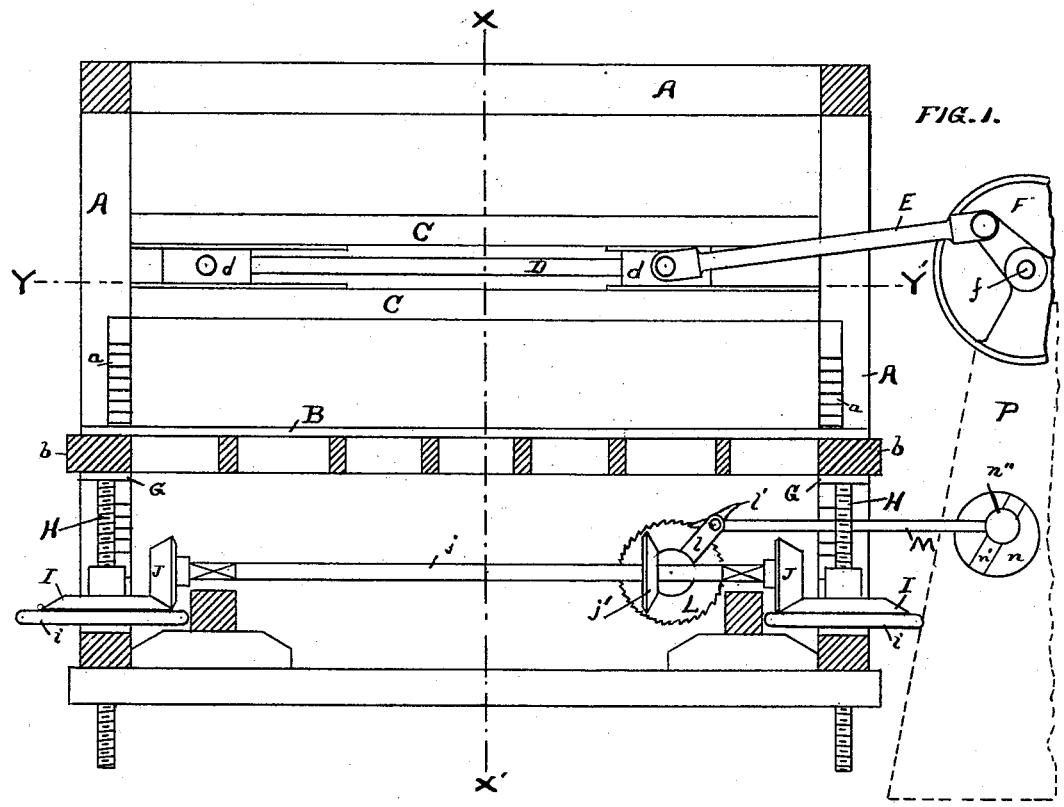

(No Model.) 3 Sheets—Sheet 1.

F. JENKINSON.
STONE SAW MILL.

No. 366,727. Patented July 19, 1887.

WITNESSES
Emma Elmore.
C. L. Redfield

INVENTOR
Frederick Jenkinson
by Jas. H. Williamson
ATTORNEY (No Model.) 3 Sheets—Sheet 2.
F. JENKINSON.
STONE SAW MILL.
No. 366,727. Patented July 19, 1887.
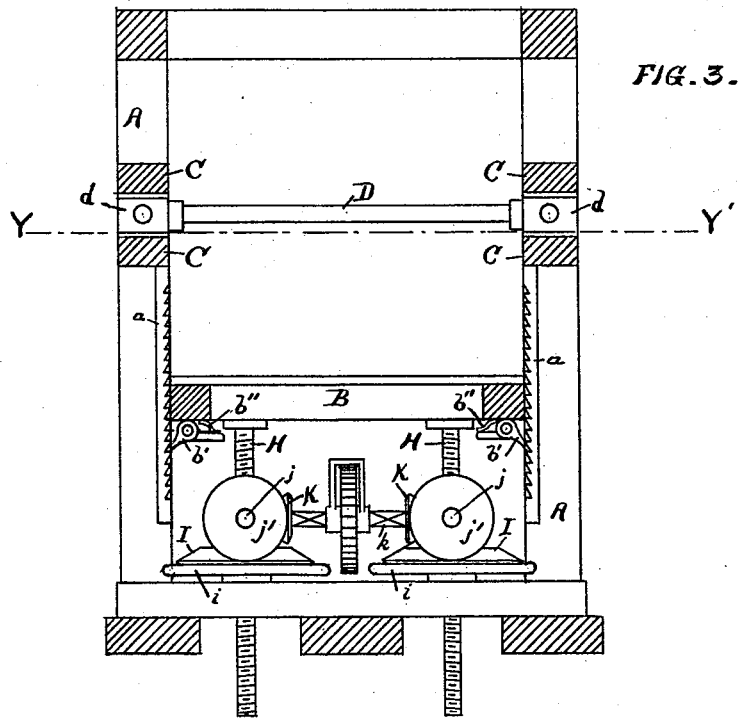
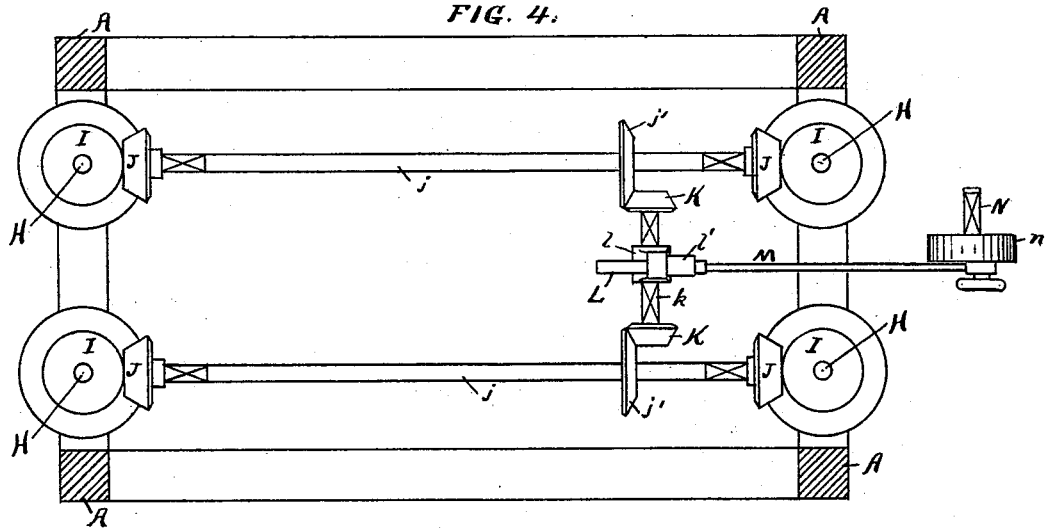
WITNESSES
Emma Elmore
C. L. Redfield
INVENTOR
Frederick Jenkinson
by Jas. F. Williamson
ATTORNEY

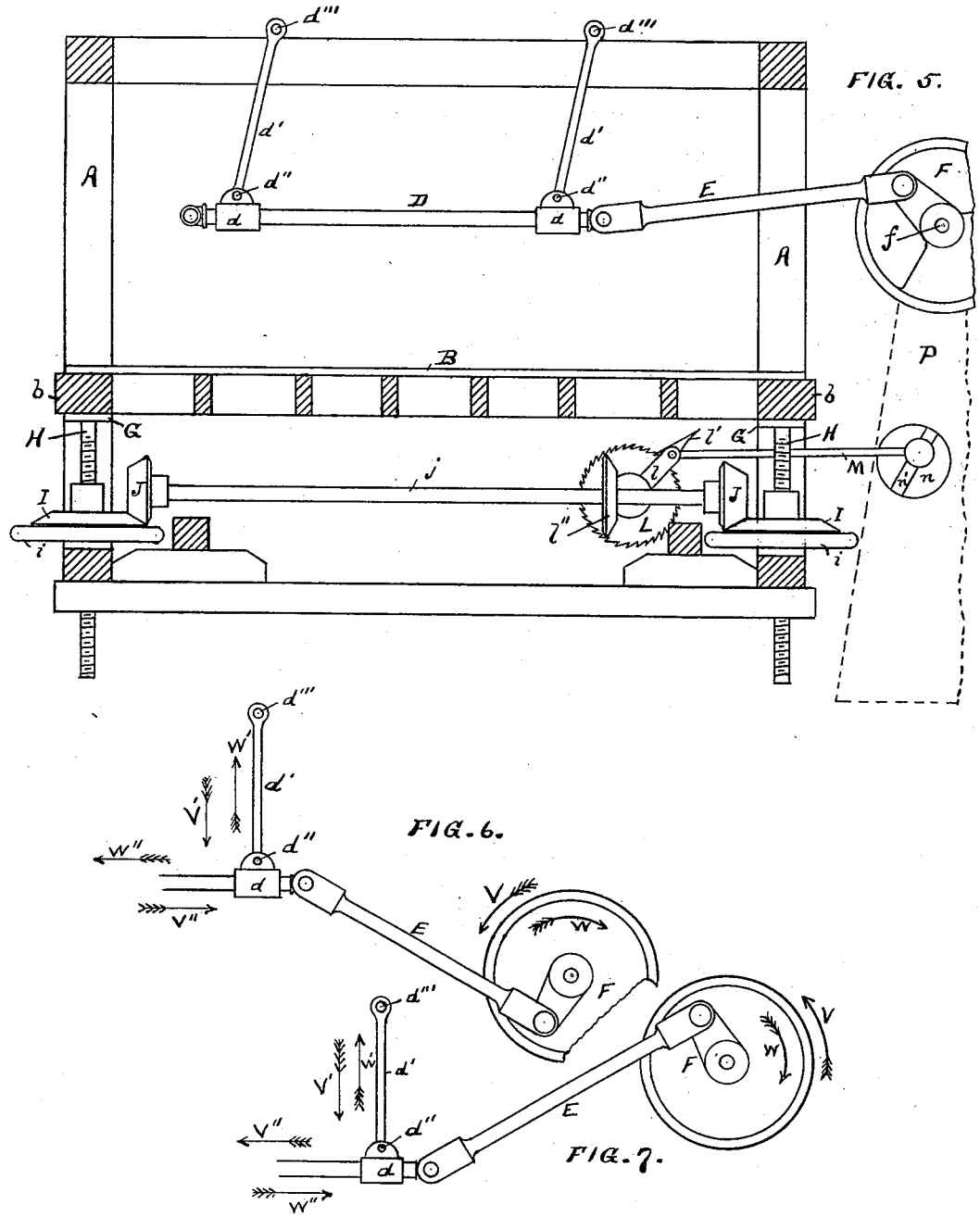

UNITED STATES PATENT OFFICE.

FREDERICK JENKINSON, OF MINNEAPOLIS, MINNESOTA.

STONE-SAW MILL.

SPECIFICATION forming part of Letters Patent No. 366,727, dated July 19, 1887.

Application filed October 7, 1886. Serial No. 215,527. (No model.)

*To all whom it may concern:*

Be it known that I, FREDERICK JENKINSON, a citizen of the United States, residing at Minneapolis, county of Hennepin, and State of Minnesota, have invented a new and useful Improvement in Stone-Saw Mills, of which the following is a specification.

My invention relates particularly to stone-saw mills; and it has for its object to overcome defects in existing mechanism, whereby a radical improvement in efficiency is secured.

In stone-saw mills of the kind in general use as constructed and operated prior to my invention the gang of saws was driven by a single long pitman attached at one end directly to the crank of the crank-shaft and at the other to the saw-frame, an illustration of which may be seen in Figs. 6 and 7 of the hereinafter-described drawings. During the very short period of time when the gang of saws would be operating on a level with the crank-shaft this old construction worked well enough; but as soon as the gang of saws was above or below the level of the crank-shaft a serious difficulty was encountered. The gang of saws would be thrust vertically away from the work or pulled down into the stone if above the level of crank-shaft, or would be pulled vertically away from the stone or thrust down into the stone if below the level of the crank-shaft, (supposing the crank-shaft to be revolving in the direction shown by arrow *w* in the drawings.) In every revolution there was this jogging of the saws. This prevented the saws from keeping uniformly to their work throughout the stroke, made it impossible to speed up the movement, produced buckling and sometimes breaking of the saws and great wear on the saws, and resulted in much waste of power and time. In sawing large blocks of stone the gang of saws is above or below the level of the crank-shaft by far the greater portion of the time, and with the old machine the saws had to be run very slowly. The farther away from the level of crank-shaft the sawing was required to be done, the greater was the jogging and the slower had to be the speed.

The object of my improvement is to overcome these difficulties and secure uniformity of work by the saws throughout the entire stroke, and uniformity and rapidity of speed without regard to the size of the stone. This I accomplish by keeping the gang of saws always on substantially the same plane on a level with the crank-shaft and feeding the stone upward by a forced feed to the saws.

My invention consists in improved mechanism for accomplishing this result, as is hereinafter fully described and claimed.

In a general way, the old machine may be described as consisting of a suitable main frame, a gang of saws suspended by swinging hangers between the vertical posts of the main frame to vertically-reciprocating blocks, mechanism consisting of a winding-roll with ropes passing over idler sheaves to the vertically-reciprocating blocks for securing this vertical adjustment and automatically feeding the saws to their work, and a single long pitman or connecting rod from the saw-frame to the crank-shaft.

Figure 2:
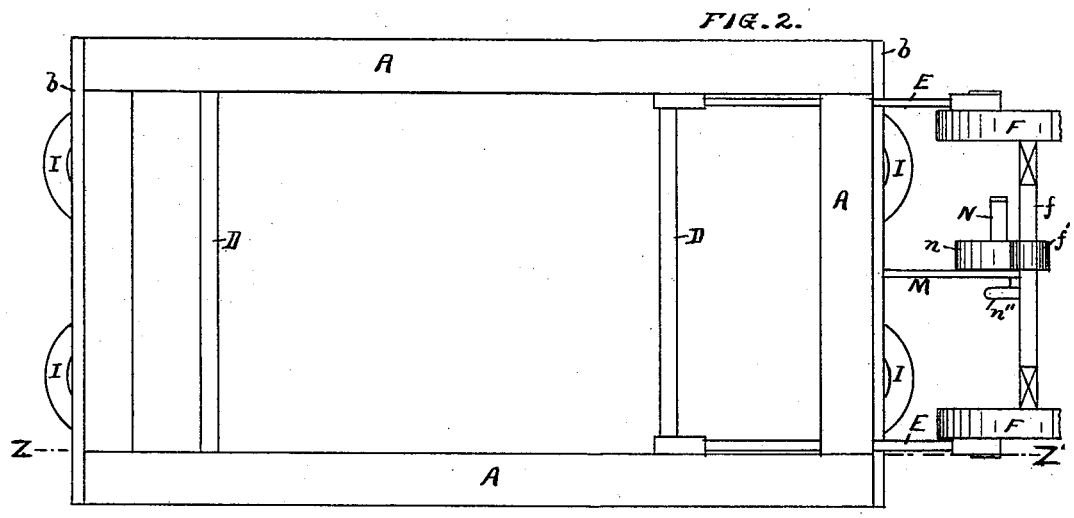

My improvement is illustrated in the accompanying drawings, in which, like letters referring to like parts throughout, Figure 2 is a plan view. Fig. 1 is a longitudinal vertical section on line *z z'* of Fig. 2. Fig. 3 is a vertical cross-section on the line *x x'* of Fig. 1. Fig. 4 is a plan view on the horizontal line *y y'* of Fig. 3. Fig. 5 is a longitudinal vertical section of a modification corresponding to Fig. 1; and Figs. 6 and 7 are detached views of part of the old machine, showing the effect of the thrust from the crank-shaft when the gang of saws is at work in its extreme positions above or below level of the crank-shaft.

A is the main frame, composed of suitable vertical posts, top and bottom plates, and cross ties and braces, care being taken to make it firm and strong.

B is a vertically-adjustable platform, placed between the vertical posts, for holding the stone to be sawed, or a truck carrying the stone to be sawed.

*a a a a* are ratchets placed on the interior face of the vertical posts A of the main frame.

*b b* are the end cross-bars of platform B.

*b' b' b' b'* are pawls on the under side of platform B, at the corners, for engaging said ratchets *a a a a*.

$b^2\ b^2\ b^2\ b^2$ are springs for keeping the pawls in engagement with the ratchets.

C C C C are longitudinal side bars—two on each side—placed near enough together to form suitable ways or grooves for horizontally reciprocating blocks d d d d, at each corner of the saw-frame D. The bearing-surfaces of these bars c c c c, on which the blocks d d d d reciprocate, are preferably made of metal.

E E are connecting-rods or pitmen attached at one end to blocks d d at end of saw-frame nearest to the crank-shaft and at the other to the disk-crank F on crank-shaft f. The crank-shaft f is suitably supported at any convenient point on pillar-block P.

f' is a pulley on crank-shaft f, for imparting motion to the same from a source of motion not shown.

G are thick blocks of rubber, serving as cushions or stiff springs, one at each corner of the platform intermediate the head of the screw and the platform.

H H H H are screws applied at each corner for raising the platform.

I I I I are bevel-gears fixed in bearings on the bottom end plates of the main frame, and provided with a female thread on the interior of their hubs for engaging male thread on the screws. The screws are of sufficient length to force the platform to any desired limit of height and pass down through the bevel gear-wheels and through the bottom plates of main frame into sockets below.

J J J J are bevel gear-wheels on longitudinal shafts j j, engaging wheels I I I I.

j' j' are bevel gear-wheels suitably located at any convenient like points on shafts j j.

K K are bevel-gears, located on the opposite ends of a shaft, k, at right angles to the shafts j j, and engaging gears j' j'.

L is a ratchet-wheel rigidly secured to shaft k.

l is a pawl-lever loosely pivoted on shaft k, and carrying a pawl, l', fitting into the teeth of the ratchet-wheel.

M is an eccentric-rod pivoted at one end to pawl-lever l and at the other eccentrically attached to the disk n on shaft N. This eccentric is adjustable on disk n toward or away from the center by slot n' and eccentric screw-pin n'', in order to vary the length of the throw of pawl l' and control the forced feed of the platform and stone. Shaft N is supported in bearings on the pillar-post P, or in any suitable way, in proper convenient position, and is operated by pulley and belt (not shown) connected directly or indirectly with the source of motion. (Not shown.) The wheels I I I I are provided with hand-rims i.

In the modification shown in Fig. 5 I suspend the saw-frame by hangers attached to suitable supports on top of main frame, instead of supporting the saw-frame in the fixed horizontal grooves.

d d d d are clamps for attaching the hangers to the saw-frame at opposite corners.

d' d' d' d' are the hangers. d'' d'' d'' d'' are their pivotal points of attachments to clamps d d d d. d''' d''' d''' d''' are their pivotal points of attachment above.

In the saw-frame are held, in any suitable manner, a series of saw-blades constituting the gang of saws.

The platform B is preferably provided with rails, (not shown,) which register when the platform is in its lowermost position with similar rails (not shown) leading to the stone-yard.

The stone is placed on a suitable truck, (not shown,) and is run over the track onto the platform, and is there blocked and locked in position.

The operation is as follows: The stone being in position on the platform, as described, motion is imparted to the crank-shaft and shaft n from the source of motion. Motion from the cranks is communicated to the saw-frame, reciprocating the gang of saws horizontally in construction shown in Figs. 1 to 4, and slightly in the arc of a circle in construction shown in Fig. 5. The crank-shaft being on same level as the gang of saws, motion is communicated very nearly on a continuous straight line, there is no jogging, and the saws may be run uniformly at any rate of speed desired. The motion of shaft N is a slow motion, and is communicated by the eccentric and pawl to the ratchet-wheel L, to the shaft K, and through the bevel-gears to the screws H H H H, raising the platform and stone and feeding the stone to the saws, as required.

The rapidity of the feed can be varied, as desired, by the adjustable eccentric varying the length of throw of the pawl l', and the speed of ratchet-wheel L and connected mechanism.

When the stone has been sawed, the platform and stone will be at their uppermost limit of vertical movement, and it will be necessary to lower them in order to remove the sawed stone and put another block on the platform. It is desirable to do this lowering by a quick movement. This can be accomplished by disengaging the pivoted pawl l' and revolving the bevel gear-wheels I I I I by any one of the hand-rims i. The pawl l may be held out of engagement by the hand, or a suitable rod and catch (not shown) can be provided for the purpose.

If desirable to lower the platform by power from the source of motion, this may readily be done by providing a shifting fast-and-loose pulley on shaft k and connecting the same by suitable belt with the main driving-shaft, and in this way the platform may be lowered as quickly as may be desired.

Sand and water may be supplied to the saws as in the old machine, (not shown,) or in any other suitable way; but I prefer to supply the water by the means shown and described by me in an application for patent of even date herewith as being the means most simple and efficient in delivering the exact quantity of water required, in the exact place required.

It may be desirable in some cases, or may be preferred by some persons, to have the saws lift slightly from the work, so as to insure the entrance of sufficient sand and water under the saws to do the cutting. For this reason the construction as in Fig. 4 is shown and described, and will work well.

What I claim, and desire to secure by Letters Patent of the United States in this application, is as follows:

1. In combination, saw-frame D, carrying a gang of saws reciprocating always on fixed lines substantially on a level with the crank-shaft, vertically-adjustable platform B, hoisting-screws H, bevel-gears I J, shaft j, bevel-gears j', shaft k, gears K, and means for imparting motion to shaft k, all substantially as described, for the purpose set forth.

2. In combination, saw-frame D, reciprocating always on fixed lines substantially on a level with the crank-shaft, adjustable platform B, screws H, bevel-gears I J, shaft j, bevel-gears j', gears K, shaft k, ratchet-wheel L, pawl-lever l, pawl l', eccentric-rod m, and shaft N, substantially as described.

3. In combination, saw-frame D, as described, platform B, screws H, bevel-gears I J, shafts j, bevel-gears j', bevel-gears K, shaft k, ratchet-wheel L, pawl-lever l, pawl l', shaft N, disk n, provided with groove n', and eccentric-rod m, adjustably attached to disk n by eccentric-pin n'' in groove n' at one end, and pivotally attached to pawl-lever l at the other, all substantially as described, for the purpose set forth.

4. In a stone-sawing machine, in combination with screw driving-shaft k, ratchet-wheel L, rigidly attached to said shaft, pawl-lever l, pivotally attached to said shaft, pawl l', eccentric-rod m, shaft N, and means for imparting motion to shaft N, all substantially as described.

5. In a stone-sawing machine, in combination, pawl-lever l and pawl l', driving-shaft N, provided with grooved disk n, and eccentric-rod m, adjustably attached at one end to the disk n and pivotally attached at the other to pawl-lever l, whereby the length of throw of the pawl and the resulting rapidity of feeding the stone may be varied, substantially as described.

FREDERICK JENKINSON.

Witnesses:
JAS. F. WILLIAMSON,
EMMA ELMORE.